Patented Jan. 10, 1939

2,143,717

UNITED STATES PATENT OFFICE 2,143,717

VAT DYESTUFFS OF THE ANTHRAQUINONE SERIES

Hans Schlichenmaier and Ludwig Wilhelm Berlin, Frankfort-on-the-Main, Germany, assignors to General Aniline Works, Inc., New York, N. Y., a corporation of Delaware No Drawing. Application July 16, 1937, Serial No. 154,070. In Germany August 14, 1936

5 Claims. (Cl. 260—377)

The present invention relates to new vat-dyestuffs of the anthraquinone series.

We have found that new vat-dyestuffs of the anthraquinone series are obtained by causing an amino-anthraquinone to react in the usual manner with an omega-trifluoromethyl-aryl-carboxylic acid halide, for instance, by heating the reaction components in a solvent of high boiling point such as nitrobenzene, trichlorobenzene, alpha-chloronaphthalene and the like, in the presence of a catalyst such as pyridine or piperidine. If the anthraquinone contains several amino groups, the reaction may be conducted, by observing certain reaction conditions, for instance, with regard to temperature or to the time of reaction, in such a way that either one or all the amino groups take part in the reaction. The free amino group may then be caused to react with the same or a different aroyl halide. The new dyestuffs are distinguished by their valuable tinctorial properties, especially by their clear tint, and they constitute a valuable enrichment of the art. They may be used as well in printing as in dyeing.

The following examples illustrate the invention, but they are not intended to limit it thereto; the parts are by weight:

(1) 50 parts of 1.5-diamino-anthraquinone are heated at a temperature of 150° C. for about 2 hours together with 100 parts of para-omega-trifluoromethyl-benzoyl fluoride and 1/10 part of pyridine in 700 parts of nitrobenzene and the mixture is then boiled until hydrogen fluoride is no longer evolved. After cooling, the dyestuff is filtered with suction, washed with a small amount of nitrobenzene and subsequently with alcohol; it is obtained in the form of yellow well defined crystalline leaflets, melting at 363° C. It dyes cotton in a Bordeaux vat beautiful fast yellow tints. The dyeing is well fast to washing, boiling and chlorine.

(2) In the process of Example 1, 1.8-diamino-anthraquinone is used instead of 1.5-diamino-anthraquinone; a dyestuff is obtained which has similar tinctorial properties and melts at 292° C.

(3) 50 parts of 1.5-diamino-anthraquinone, 100 parts of meta-omega-trifluoromethyl-benzoyl fluoride are heated at 150° C. for two hours in 500 parts of nitrobenzene. While adding another 10 parts of meta-omega-trifluoromethyl-benzoyl fluoride, the whole is gradually heated to boiling and kept at boiling temperature until hydrogen fluoride is no longer evolved. The dyestuff is isolated as described in Example 1 and a body is obtained which crystallizes in tetragonal yellow leaflets and melts at 290° C.–292° C. The yield is very good. The dyestuff dyes cotton very clear fast yellow tints.

(4) By using in Example 3 1.8-diamino-anthraquinone instead of 1.5-diamino-anthraquinone, a yellow dyestuff of similar good tinctorial properties, melting at 218° C. is obtained.

(5) 50 parts of 4-amino-1.9-anthrapyrimidine are heated for about 7 hours, at 150° C. and then to boiling, together with 100 parts of para-omega-trifluoro-methyl-benzoyl fluoride in 700 parts of nitrobenzene. A body crystallizes on cooling in the form of yellow needles which are filtered with suction and washed. It melts at about 220° C. and dyes cotton from the vat greenish yellow tints.

(6) 50 parts of 1.4-diamino-anthraquinone, 100 parts of para-omega-trifluoromethyl-benzoyl fluoride, 800 parts of nitrobenzene are gradually heated together to boiling with 1/10 part of pyridine and kept at boiling temperature until hydrogen fluoride is no longer evolved. The product is filtered while hot and allowed to cool. After filtration with suction and washing, a red body is obtained in the form of beautiful needles, melting at 352° C.–353° C. It dyes cotton in a violet vat fast clear scarlet tints.

(7) By using in Example 6 instead of para-omega-trifluoromethyl-benzoyl fluoride the corresponding meta-compound, a red dyestuff melting at 212° C. is obtained; it dyes cotton in a violet vat beautiful salmon red tints.

(8) 70 parts of 1-amino-5-benzoylamino-anthraquinone are slowly heated to boiling together with 100 parts of para-omega-trifluoromethyl-benzoyl fluoride in 700 parts of nitrobenzene and kept at boiling temperature, until hydrogen fluoride is no longer evolved. The body, isolated as described in Example 1 forms yellow tetragonal leaflets melting at 297° C.–298° C. and dyes cotton in a vat fast yellow tints of very good properties.

(9) By using in Example 8 instead of para-omega-trifluoromethyl-benzoyl fluoride the corresponding meta-compound, a yellow dyestuff of similar good tinctorial properties melting at 250° C. is obtained.

(10) 60 parts of 4-amino-2.1-anthraquinone-benzacridone, 100 parts of meta-omega-trifluoromethyl-benzoyl fluoride and 1 part of pyridine in 800 parts of nitrobenzene are kept at boiling temperature for about 2½–3 hours. After cooling, the product is filtered with suction; the condensation product is obtained in the form of brilliant, violet needles melting at 284° C. The dyestuff dyes in a Bordeaux vat fast, clear, blue tints being especially fast to chlorine.

(11) 50 parts of 4-amino-2.1-anthraquinone-6'-chlorobenzacridone of the formula:

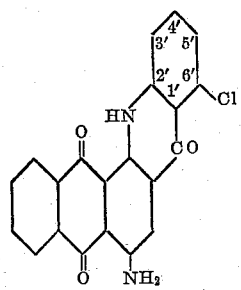

preparable by condensation of 1-bromo-4-amino-anthraquinone-2-sulfonic acid with 6-chloranthranilic acid, are heated at 198° C.–200° C. for about 1½–2 hours together with 100 parts of meta-omega-trifluoromethyl-benzoyl fluoride and about ½ part of pyridine in 600 parts of nitrobenzene; by this process, the green-blue solution of the amino-acridone turns violet. After cooling and filtering with suction, a dyestuff having a violet luster and melting at 318° C. is obtained in a pure crystalline form. It dissolves in sulfuric acid to an orange solution and dyes in an intense violet vat very beautiful clear blue tints of good fastness properties.

(12) By using in Example 11 instead of the meta-omega-trifluoromethyl-benzoyl fluoride the para-omega-trifluoromethyl-benzoyl fluoride, the corresponding para-CF₃-benzoyl-amino-acridone melting at 393° C. is obtained; used as dyestuff it has similar properties of fastness as that obtained according to Example 11.

(13) 40 parts of 4-amino-2.1-anthraquinone-3',5'-dichlorobenzacridone are suspended in 50 parts of nitrobenzene with addition of about ½ part of pyridine; 50 parts of meta-omega-trifluoromethylbenzoyl fluoride are slowly run in at about 180° C. and the whole is heated at 202° C., until hydrogen fluoride no longer evolves which occurs at the end of about 2 hours. After cooling, the product is filtered with suction; the dyestuff is obtained, with a good yield, in the form of violet needles melting at 291° C. It dyes in a violet vat blue tints of good properties of fastness.

(14) If in Example 13 the meta-omega-trifluoromethylbenzoyl fluoride is exchanged for the acid fluoride of the following formula:

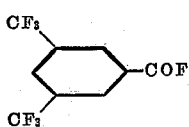

there is obtained, in an analogous manner, a violet dyestuff which melts at 341° and dyes cotton in a violet vat fast blue tints.

(15) 35 parts of 4-amino-thioxanthone of the following constitution:

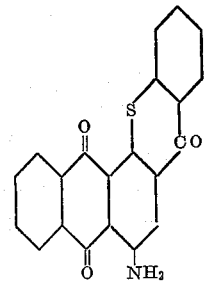

100 parts of meta-omega-trifluoromethyl-benzoyl fluoride and ½ part of pyridine in 400 parts of nitrobenzene are heated for about 8 hours to 190° C.–200° C. On cooling, the reaction product separates in the form of red crystals melting at 305° C. The dyestuff obtained dyes cotton in an intense red-blue vat bluish-red tints.

(16) 7 parts of 4.8-diamino-anthrarufine are heated to gentle boiling at 190° C.–200° C. for about 2½ hours together with 15 parts of para-omega-trifluoromethyl-benzoyl fluoride and ¼ part of pyridine in 80 parts of nitrobenzene, until hydrogen fluoride no longer evolves. On cooling, the dyestuff separates in the form of brown to violet crystals melting at 349° C. It dyes cotton in a red-brown vat very clear and intense violet tints.

The dyeings are distinguished by a very good fastness to light and a beautiful shade.

(17) If meta-omega-trifluoromethyl-benzoyl fluoride is caused, according to the process of Example 16, to act upon 4.8-diamino-anthrarufine, a very pure dyestuff melting at 320° C. is obtained which dyes cotton and artificial silk very vivid violet tints of good fastness to light.

(18) 5 parts of 1.5-diamino-anthraquinone are heated to boiling for about one hour together with 10 parts of ortho-omega-trifluoro-methylbenzoyl chloride and about 1/10 part of pyridine in 60 parts of dichlorobenzene. On cooling, the reaction product crystallizes in the form of yellow needles having a golden luster and melting at 311° C.

We claim:

1. Water-insoluble anthraquinone compounds containing in alpha-position the group of the general formula:

—NHCO—aryl—CF₃ aryl belonging to the benzene series, being vat-dyestuffs yielding dyeings of very clear tints.

2. Water-insoluble anthraquinone compounds containing in two alpha-positions the group of the general formula:

—NHCO—aryl—CF₃ aryl belonging to the benzene series, being vat-dyestuffs yielding dyeings of very clear tints.

3. The compound of the formula:

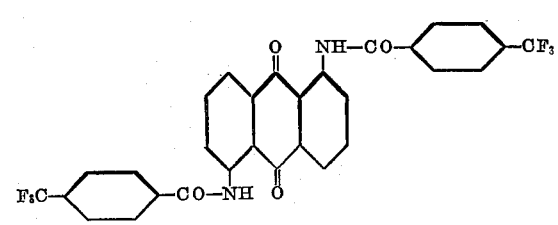

being a vat-dyestuff yielding on cotton from a

Bordeaux vat beautiful fast yellow tints of good fastness to washing, boiling and chlorine.

4. The compound of the formula:

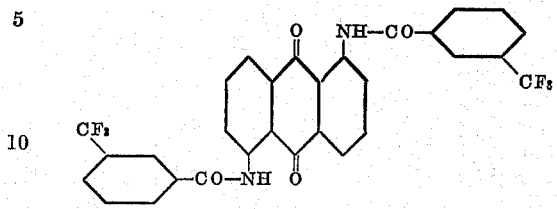

being a vat-dyestuff yielding on cotton very clear fast yellow tints.

5. The compound of the formula:

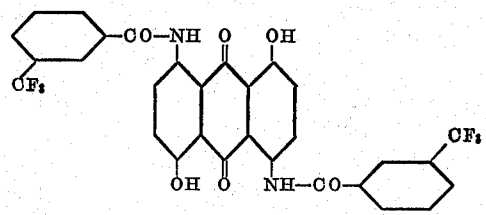

being a vat-dyestuff yielding on cotton and artificial silk very vivid violet tints of good fastness to light.

HANS SCHLICHENMAIER.
LUDWIG WILHELM BERLIN.